United States Patent

Uemura et al.

Patent Number: 6,079,484
Date of Patent: *Jun. 27, 2000

[54] AIR CONDITIONING APPARATUS FOR VEHICLE

[75] Inventors: Yukio Uemura; Kenji Suwa; Kazushi Shikata, all of Kariya, Japan

[73] Assignee: Denso Corporation, Kariya, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/858,874

[22] Filed: May 19, 1997

[30] Foreign Application Priority Data

May 23, 1996 [JP] Japan ................................. 8-128702

[51] Int. Cl.⁷ .................................................. B60H 3/00
[52] U.S. Cl. .......................... 165/42; 165/43; 165/202; 165/204; 62/244
[58] Field of Search ................ 165/42, 43, 202, 165/203, 204; 62/244

[56] References Cited

U.S. PATENT DOCUMENTS

| | | | |
|---|---|---|---|
| 4,407,354 | 10/1983 | Takishita et al. | 165/42 |
| 4,513,808 | 4/1985 | Ito et al. | 165/43 |
| 4,702,307 | 10/1987 | Ito et al. | 165/42 |
| 4,844,150 | 7/1989 | Nakazawa | 165/42 |
| 5,162,020 | 11/1992 | Asano et al. | 165/42 |
| 5,392,845 | 2/1995 | Honda et al. | 165/42 |
| 5,699,851 | 12/1997 | Saida et al. | 165/42 |
| 5,701,949 | 12/1997 | Yamaguchi et al. | 165/42 |
| 5,775,407 | 7/1998 | Inoue | 165/42 |
| 5,836,380 | 11/1998 | Takesita et al. | 165/42 |
| 5,857,905 | 12/1999 | Uemura et al. | 165/42 |
| 5,907,380 | 5/1999 | Scoccia | 165/42 |

FOREIGN PATENT DOCUMENTS

| | | | |
|---|---|---|---|
| 61-226314 | 10/1986 | Japan | 165/42 |
| 62-40013 U | 3/1987 | Japan . | |
| 1-212615 | 8/1989 | Japan | 165/42 |
| 4-95520 | 3/1992 | Japan | 165/42 |
| 3820-412 | 1/1989 | United Kingdom | 165/42 |

*Primary Examiner*—Ira S. Lazarus
*Assistant Examiner*—Terrell McKinnon
*Attorney, Agent, or Firm*—Harness, Dickey & Pierce, PLC

[57] ABSTRACT

According to the present invention, in an air-mixing type air conditioning apparatus in which an air-mixing door is disposed at an air upstream side of a heater core and without having a hot water control valve for shutting off a flow of hot water into the heater core, a warm air passage formed at an air downstream side of the heater core is narrowed by a foot door in a face mode where a face air passage is closed by a face door. In this way, in the maximum cooling operation, with the foot door, it is possible to favorably suppress the air heated by hot water in the heater core from being mixed into cool air by natural convection.

17 Claims, 6 Drawing Sheets

AIR CONDITIONING APPARATUS FOR VEHICLE

CROSS REFERENCE TO THE RELATED APPLICATION

This application is based on and claims priority of Japanese Patent Application No. Hei. 8-128702 filed on May 23, 1996, the content of which are incorporated herein by reference.

BACKGROUND OF THE INVENTION

1. Field of the Invention

The present invention relates to an air-mixing type air conditioning apparatus for a vehicle, which controls a temperature of blown-air by adjusting an air-amount ratio of cool air and warm air, and particularly relates to a mechanism for securing the maximum cooling capacity in an air conditioning apparatus without employing a hot water valve for shutting off hot water flowing into a heater core.

2. Description of Related Art

Conventionally, in the air-mixing type air conditioning apparatus for a vehicle, provided with a heater core (heating heat exchanger) for heating air by using hot water (engine cooling water) as heating source, generally, the maximum cooling capacity is secured by shutting off the hot water flowing into the heater core in the maximum cooling operation.

Recently, to reduce the cost of the air conditioning apparatus for a vehicle, an omission of the hot water valve has been partly put into a practice. When the hot water valve is omitted, the hot water circulates in the heater core also in the maximum cooling operation, air around the heater core is heated, and the heated air is mixed into cool air by natural convection. Thus, there occurs a problem in that the maximum cooling capacity may deteriorate.

To overcome this problem, as disclosed in JP-U-62-40013, air-mixing doors are disposed before and behind the air passage of the heater core, respectively, so that it is suppressed for the heated air to be mixed with the cool air.

However, in such a conventional type, as compared with the general type, since one of the air mixing door is added, as much the effect for reducing the cost may deteriorate.

SUMMARY OF THE INVENTION

It is accordingly an object of the present invention to secure the maximum cooling capacity without adding the air-mixing door in the air-mixing type air conditioning apparatus without employing a hot water valve for shutting off a flow of the hot water valve.

According to the present invention, in an air-mixing type air conditioning apparatus where an air mixing door is disposed at an air upstream side of a heating heat exchanger to control a temperature of conditioned air to be blown into a passenger compartment by adjusting a ratio between an amount of hot air flowing through the heating heat exchanger and an amount of cool air bypassing the heating heat exchanger, a warm air passage formed at an air downstream side of the heating heat exchanger is narrowed by an air outlet mode switching door in a face mode where a face air passage is opened by the air outlet mode switching door.

When the hot water valve for shutting off a flow of hot water into the heating heat exchanger is omitted, in the maximum cooling operation, the hot water always circulates in the heating exchanger. Therefore, air heated by the heating heat exchanger may be mixed into cool air by natural convection.

However, in the face mode where the maximum cooling operation is set, since the warm air passage formed at an air downstream side of the heat exchanger is narrowed by the air outlet mode switching door, it is possible to favorably suppress the air heated by the heat exchanger from being mixed into a flow of cool air. Therefore, even when the hot water valve is not employed in a hot water circuit of the heating heat exchanger, the maximum cooling capacity is suppressed from deteriorating so that the maximum cooling capacity can be secured.

Accordingly, by commonly using the air outlet mode switching door, it is possible to secure the maximum cooling capacity without adding the air-mixing door as in the conventional apparatus. Therefore, the maximum cooling capacity and the reduction of the cost can be simultaneously secured.

BRIEF DESCRIPTION OF THE DRAWINGS

Additional objects and advantages of the present invention will be more readily apparent from the following detailed description of preferred embodiments thereof when taken together with the accompanying drawings in which.

DESCRIPTION OF THE PRESENTLY PREFERRED EMBODIMENTS

Embodiments of the present invention will be described with reference to the drawings.

FIGS. 1–7 show an embodiment of the present invention. A blower unit 1 of an air conditioning apparatus disposed at a biased position from a center of an instrumental panel of a passenger compartment (not shown) in a width direction of a vehicle (toward a left side when the vehicle has a right side steering wheel) and in a portion at a front side of a passenger's seat next to a driver's seat.

Figure 1:
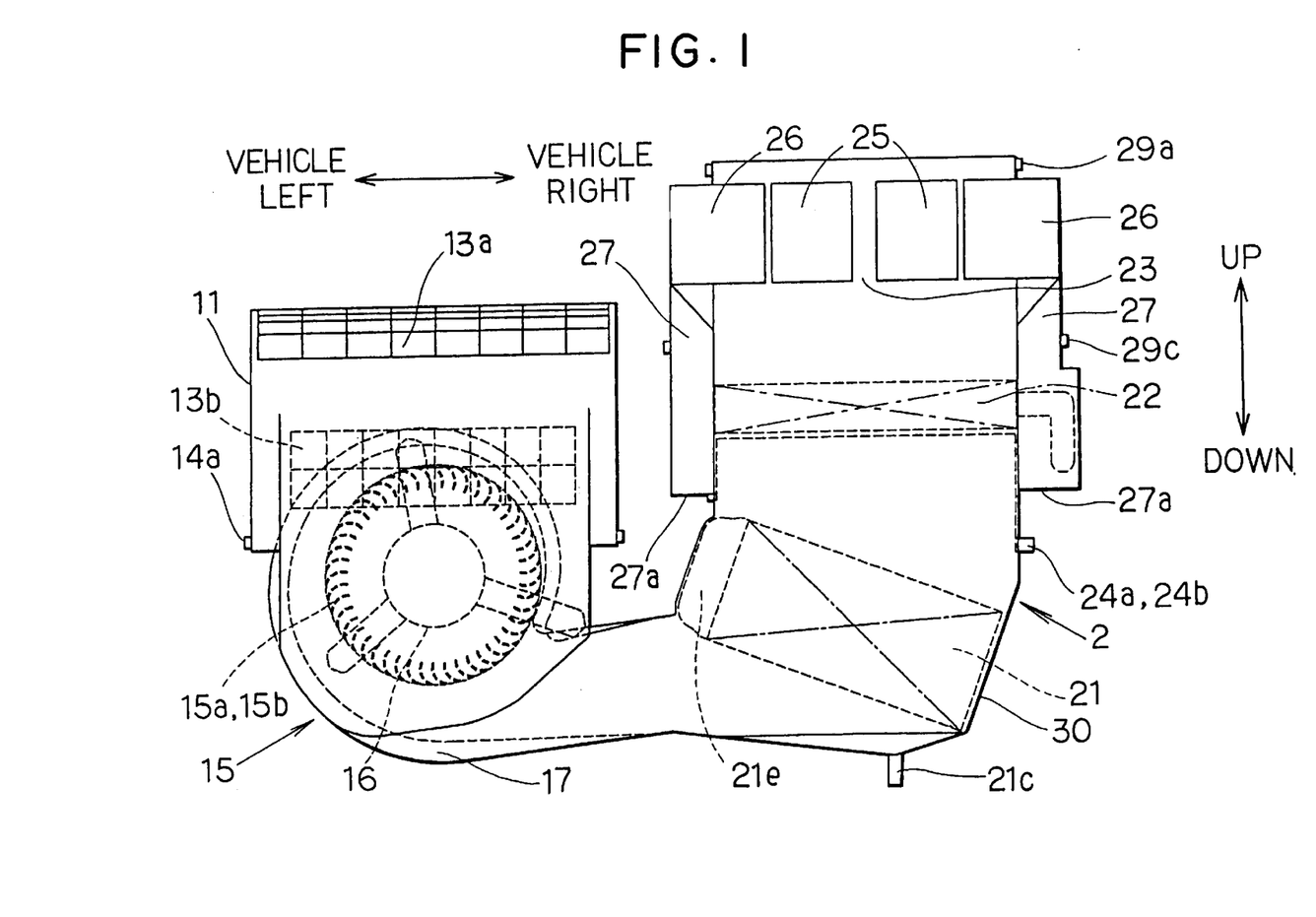
FIG. 1 is a front view of an embodiment of the present invention.
Figure 3:
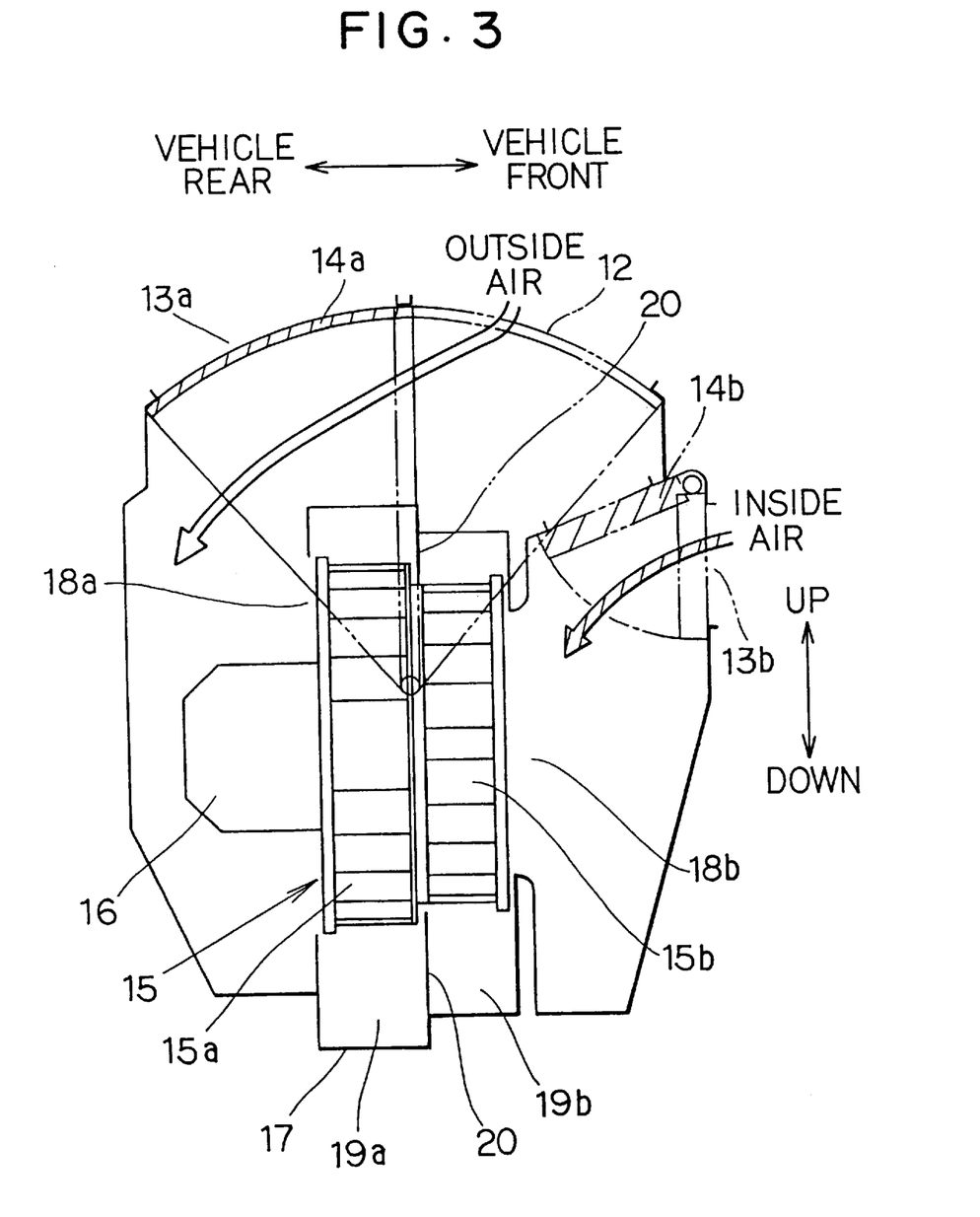
FIG. 3 is a cross sectional view showing a blower unit of the embodiment.

As shown in FIG. 1, the blower unit 1 includes at an upper side thereof an inside air/outside air switching box 11 made of resin, for switching and introducing inside air and outside air. To the inside air/outside air switching box 11, as shown in FIG. 3, there are opened an outside air introduction port 12, and a first and a second inside air introduction ports 13a and 13b. In the inside air/outside air switching box 11, there are disposed a first and a second inside air/outside air switching doors 14a and 14b for opening or closing the outside air introduction port 12 and the first and second inside air introduction ports 13a and 13b, respectively. The first inside air/outside air switching doors 14a is of a rotary type having an arcuate circumferential surface, and the second inside air/outside air switching doors 14a is formed of a general plate door.

Below the inside air/outside air switching box 11, as shown in FIG. 1, there is disposed a blower 15 which includes centrifugal type multi-blade fans (sirocco fans) 15a and 15b made of resin, a motor for driving fans 16, and a scroll casing 17 made of resin.

Here, the blower 15 has the fan 15a having a large outer diameter and disposed at a side of the motor 16 and the fan 15b having a small outer diameter disposed at an opposite side of the motor 16. Rotary shafts of both fans 15a and 15b are disposed in a substantially horizontal direction. By a rotation of the fan 15a, air is sucked from the inside air/outside air switching box 11 through a first air suction port 18a, and by a rotation of the fan 15b, air is sucked from air is sucked from the inside air/outside air switching box 11 through a second air suction port 18b.

An interior of the scroll casing 17 is partitioned by a partition plate 20 into a first air passage 19a in which air blown by the fan 15a flows and a second air passage 19b in which air blown by the fan 15b flows.

Figure 2:
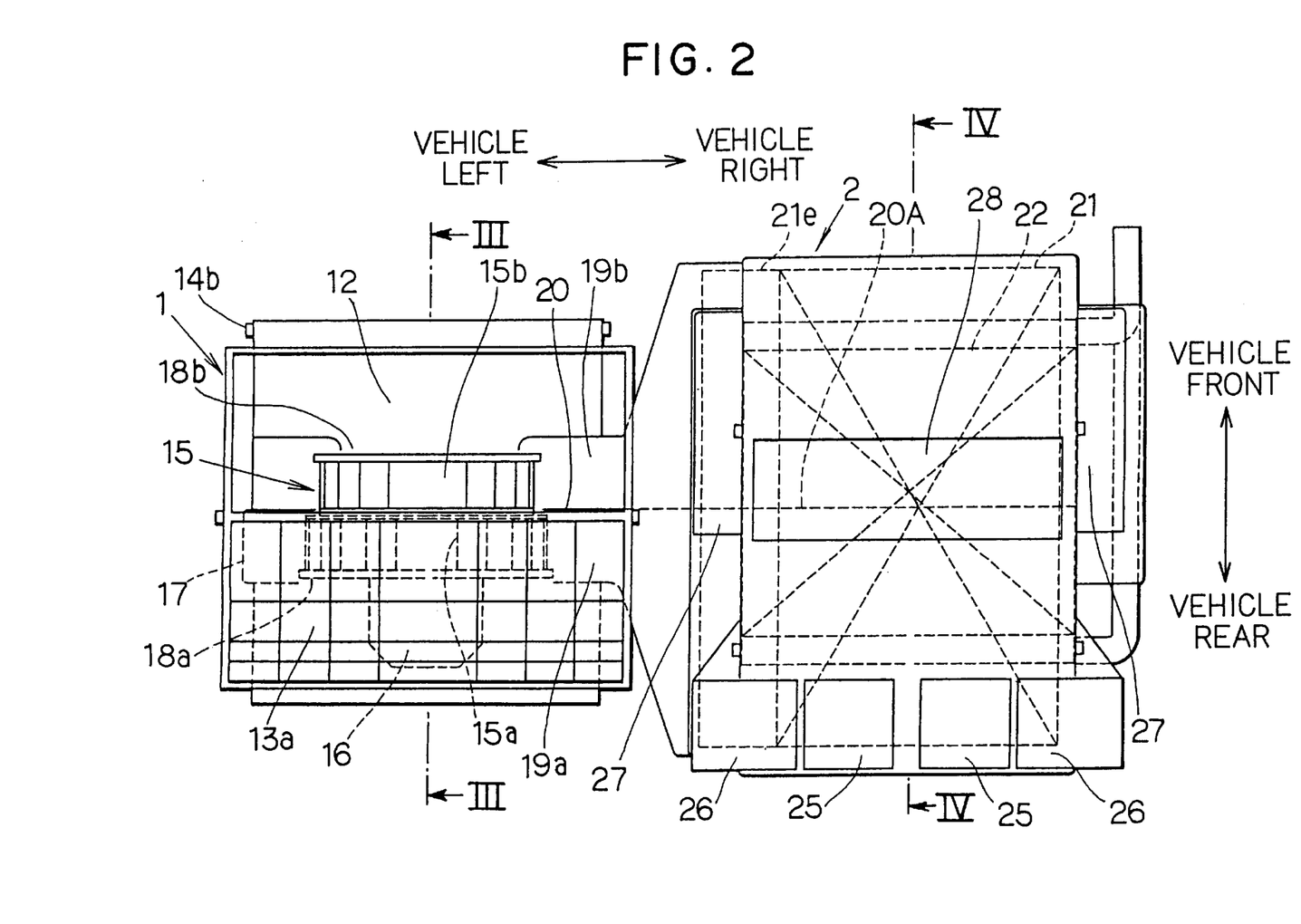
FIG. 2 is a plan view of FIG. 1.

As shown in FIG. 2, the partition plate 20 is disposed in a substantially perpendicular direction so that the first air passage 19a and the second air passage 19b are partitioned in the front-and rear direction of the vehicle and extend in parallel from the left side to the right side of the vehicle. Accordingly, the air is blown in parallel in each of the passages 19a and 19b from an outlet portion of the scroll casing 17 in a substantially horizontal direction from the left side to the right side.

A case of the blower unit 1 is divided into a portion of the inside air/outside air switching box 11 and a portion of the scroll casing 17. Further, the portion of the scroll casing 17 is halved in the left-and-right direction. By dividing the case, the doors 14a and 14b and the fans 15 and 15b or the like are assembled into the case. The partition plate 20 is molded integrally with an inner wall surface of the scroll casing 17 made of resin.

On the other hand, an air conditioning unit 2 for accommodating an air conditioning heat exchanger (described later) is disposed at a substantially center portion of the instrumental panel in the passenger compartment. In the air conditioning unit 2, an evaporator (cooling heat exchanger) 21 of refrigerating cycle is, as shown in FIG. 1, disposed in a substantially horizontal direction so that air blown from the blower unit 1 flows thereinto from a lower side.

The heater core (heating heat exchanger) 22 is disposed in a substantially horizontal direction at an air upstream side of the evaporator 21 (at an upper side in the passenger compartment). The heater core 22 is for heating air by using the engine cooling water (hot water) as heating source, and is connected directly to a circuit of the engine cooling water without passing through the hot water valve. An air outlet mode switching portion 23 is disposed at an upper side portion (at an air downstream side) of the heater core 22 in the passenger compartment.

Figure 4:
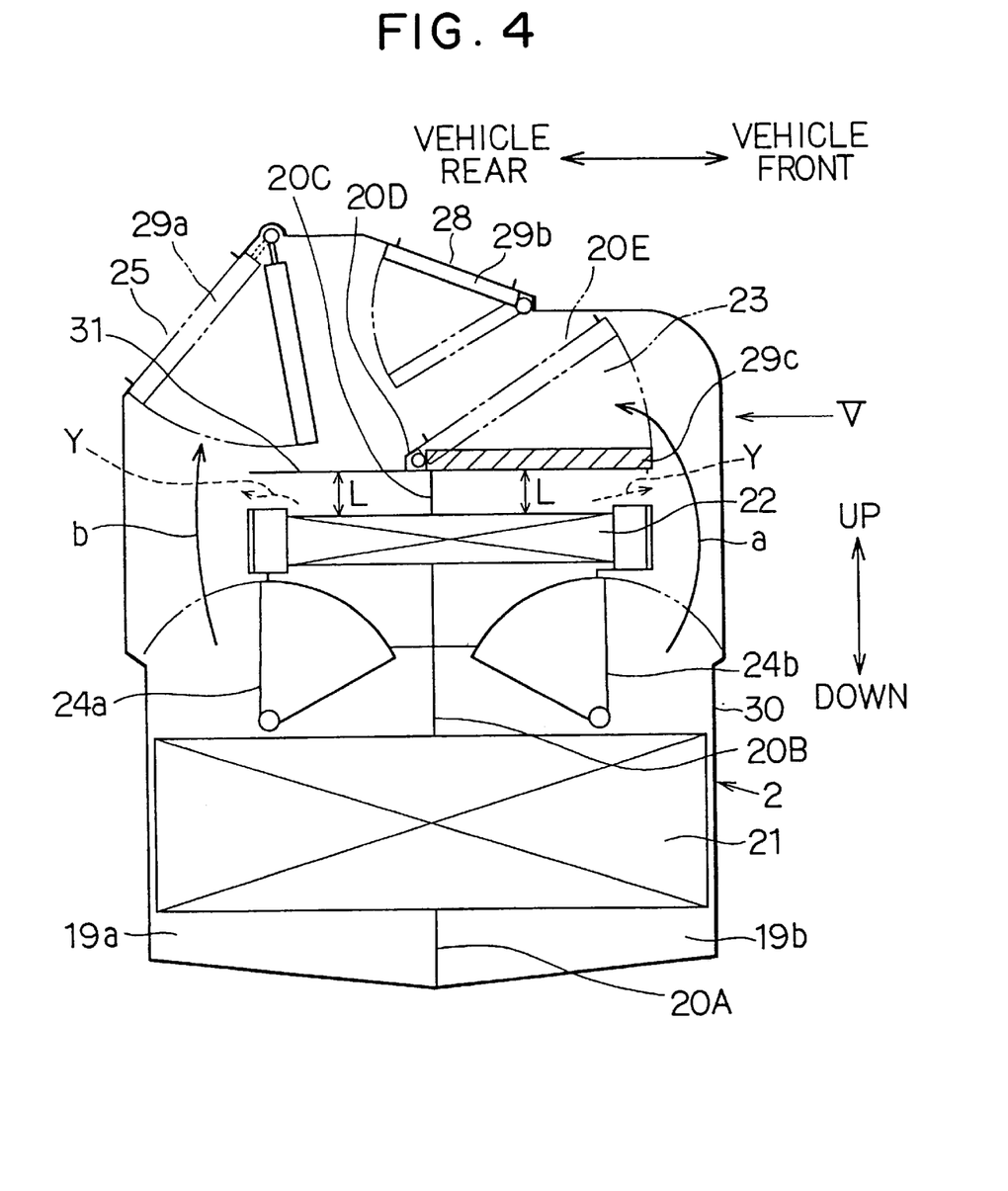
FIG. 4 is a cross sectional view showing an air conditioning unit of the embodiment.

In this embodiment, the air-mixing method is employed to control a temperature of conditioned air. As shown in FIG. 4, a ratio between an amount of warm air passing through the heater core 22 and an amount of cool air bypassing the heater core 22 is adjusted by opening degrees of the air-mixing doors 24a and 24b disposed at a lower side (at an air upstream side) of the heater core 22 so that the temperature of air to be blown out into the passenger compartment is controlled. Rotary type doors each having an arcuate circumferential surface are employed as air-mixing doors 24a and 24b.

Also in the air conditioning unit 2, an inside air passage is partitioned by partition plates 20A, 20B, and 20C into a first air passage 19a and a second air passage 19b in the front-and-rear direction of the vehicle such that air flows in both passages independently.

The air outlet mode switching portion 23 is for switching an air outlet mode of air blown into the passenger compartment. The air outlet mode switching portion 23 includes a center face air passage 25 and a side face air passage 26 communicated with a center face (upper) air outlet (not shown) and a side face air outlet, respectively, both for blowing air toward a head portion of a passenger in the passenger compartment, a foot air passage 27 communicated with a foot air outlet 27a for blowing air toward feet portion of the passenger, and a defroster air passage 28 communicated with a defroster air outlet (not shown) for blowing air toward an inner surface of a windshield. These plural air passages 25, 27, and 28 are selectively opened or closed by door means.

In this embodiment, as shown in FIGS. 4–7, the plate doors 29a–29c are employed as door means for switching air outlet mode; however, a rotary door having an arcuate outer circumferential surface or a film door can be also employed.

In FIGS. 4–7, the doors 29a–29c are employed for the center face air passage 25, the defroster air passage 28, and the foot air passage 27, respectively. The side face air passage 26 is, as known well, always communicated with a space in the air outlet mode switching portion 23, and an intermittence and a direction of the air blown from the side face air outlet can be adjusted by an operation of an air outlet grille provided with the side face air outlet.

In this embodiment, by selecting operational (rotational) positions of plate air outlet mode doors 29a, 29b, and 29c, a plurality of the air outlet passages 25, 27, and 28 are selectively opened or closed so that a plurality of air outlet modes including, as known well, a face air outlet mode, a bi-level air outlet mode, a foot air outlet mode, a foot/defroster air outlet mode, a defroster air outlet mode, or the like can be selected. The plate air outlet mode doors 29a, 29b, and 29c are interlockingly operated by an electric actuator such as a servomotor via a known link and lever mechanism or a manual operation mechanism using a cable.

The case 30 is constructed by a case made of resin which is divided into four pieces in a vertical direction. That is, although not shown in detail, the case 30 is divided into a lower case for accommodating the evaporator 21, an intermediate case for accommodating the heater core 22, and two of the front and rear upper cases for constructing the air outlet mode switching portion 23. In the case 30, the heat exchangers, the doors, and the like are incorporated. The partition plates 20A, 20B, and 20C are molded integrally with inner wall surfaces of these cases made of resin.

Divided cases in each of the blower unit 1 and the air conditioning unit 2 are detachably connected to each other by using a known metal clip having an elasticity, a screw, or the like.

The evaporator 21 is disposed to be slightly inclined from a horizontal plane to facilitate a drainage of the condensed liquid generated by cooling function thereof. That is, as shown in FIG. 1, the evaporator 21 is disposed to be inclined downward toward a front side (the right direction in FIG. 1) of the air blown by the blower 15 toward the lower side of the evaporator 21.

The evaporator 21 is of a known laminated type in which tubes (not shown) are constructed by laminating thin metal plates, which are superior in heat conductivity and corrosion resistance, such as aluminum in the right-and-left direction of FIG. 4. The tube of the evaporator 21 is formed as a flat tube having a flat cross section. The plurality of tubes are laminated in such a manner that a tube wall surface thereof as the flat surface is disposed substantially in parallel with an air flow.

The partition plates 20A and 20B disposed at upwind and downwind sides, respectively, are disposed along end portions at upwind and downwind sides, of one tube at a center portion of the evaporator 21, respectively, so that the partition plates 20A and 20B and the tube at the center portion are disposed on the same plane. Accordingly, plate surfaces of the partition plates 20A and 20B and the tube wall surface of the tube extend on a single line.

Thus, the air flowing direction at the upwind and downwind sides of the evaporator 21 is coincident with the air passages within the evaporator 21.

As shown in FIG. 4, the partition plate 20C disposed at a downwind side of the heater core 22 has an upper portion which is bent obliquely toward an upper and right side. In the oblique bending surface 20D, there is formed a communication opening 20E for communicating the first air passage 19a and the second air passage 19b. The communication opening 20E is opened or closed by the foot door 29c.

As shown in FIG. 4, the center face air passage 25 and the defroster air passage 28 are disposed at the side of the first air passage 19a, and the foot air passage 27 is disposed at the side of the second air passage 19b. Although not shown in FIG. 4, the side face air passage 26 is disposed at the side of the first air passage 19a.

Figure 5:
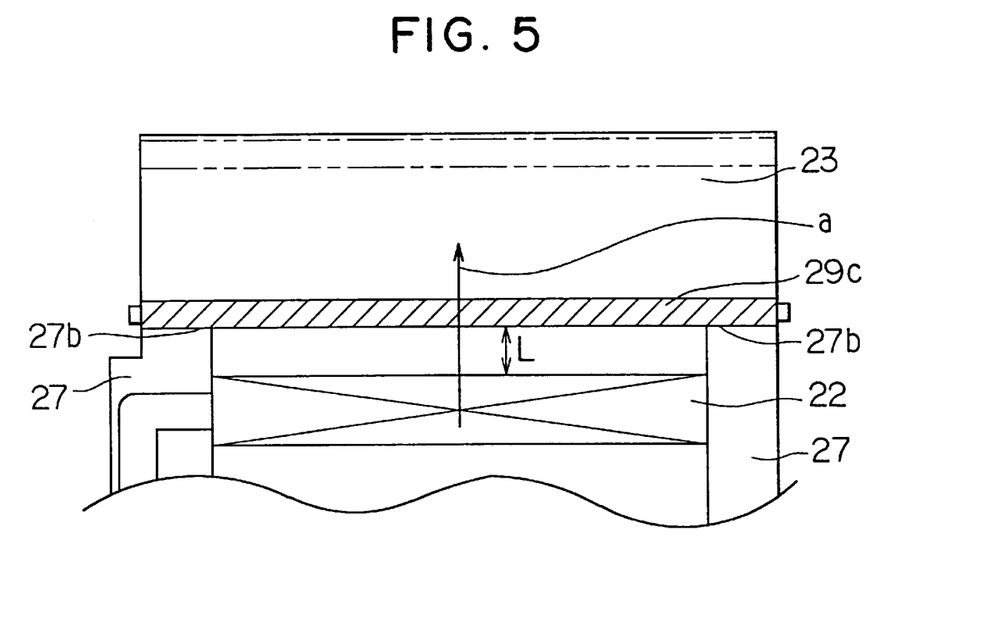
FIG. 5 is a cross sectional view as viewed along an arrow V of FIG. 4.

FIGS. 4 and 5 show an operational position of the door in the face air outlet mode and the defroster air outlet mode, in other words, in the air outlet mode where the foot air passage 27 is closed. In the operational position of the door shown in FIGS. 4 and 5, the foot door 29c is operated at a position shown by a solid line so that the inlet portion 27b of the foot air passage 27 is closed (see FIG. 5). While the foot air passage 27 is closed, as shown in FIGS. 4 and 5, the foot door 29c is operated at a position adjacent to the downwind side of the heater core 22 by a minute distance L (for example, approximately 15 mm). In this way, the warm air passage at the downwind side of the heater core 22 is narrowed.

Simultaneously, the communication opening 20E is opened by operating the foot door 29c to a position shown by the solid line so that the air "a" in the second air passage 19b can flow through the communication opening 20E toward the face air passages 25 and 26 and the defroster air passage 28.

Further, the foot air passages 27 are, as shown in FIG. 5, disposed at both sides (both sides in the right-and-left direction of the vehicle) of the main air passage passing through the heater core 22, and two foot air passages 27 are opened or closed by the foot door composed of a single plate door.

Figure 6:
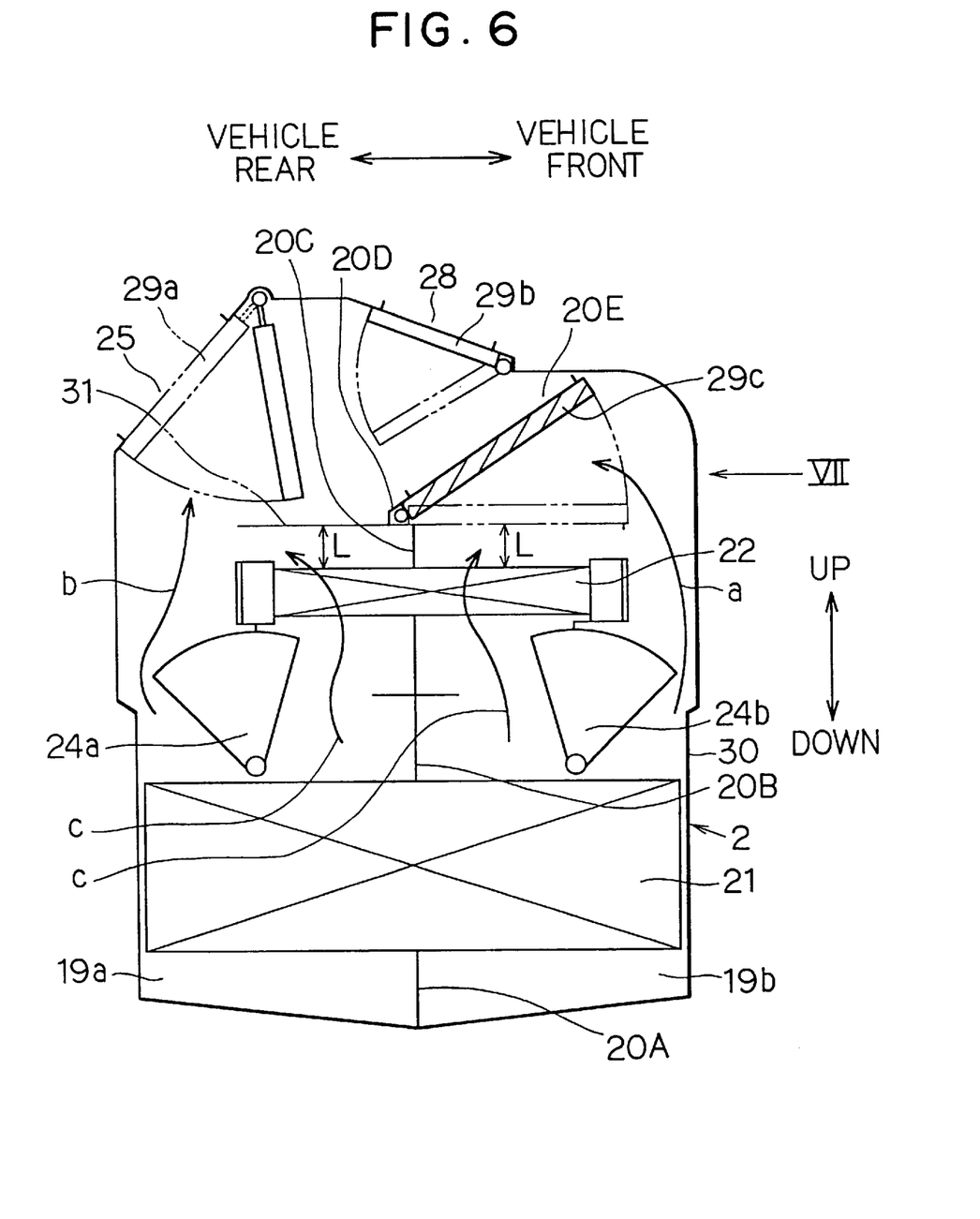
FIG. 6 is another cross sectional view in a different air outlet mode from that in FIG. 5.
Figure 7:
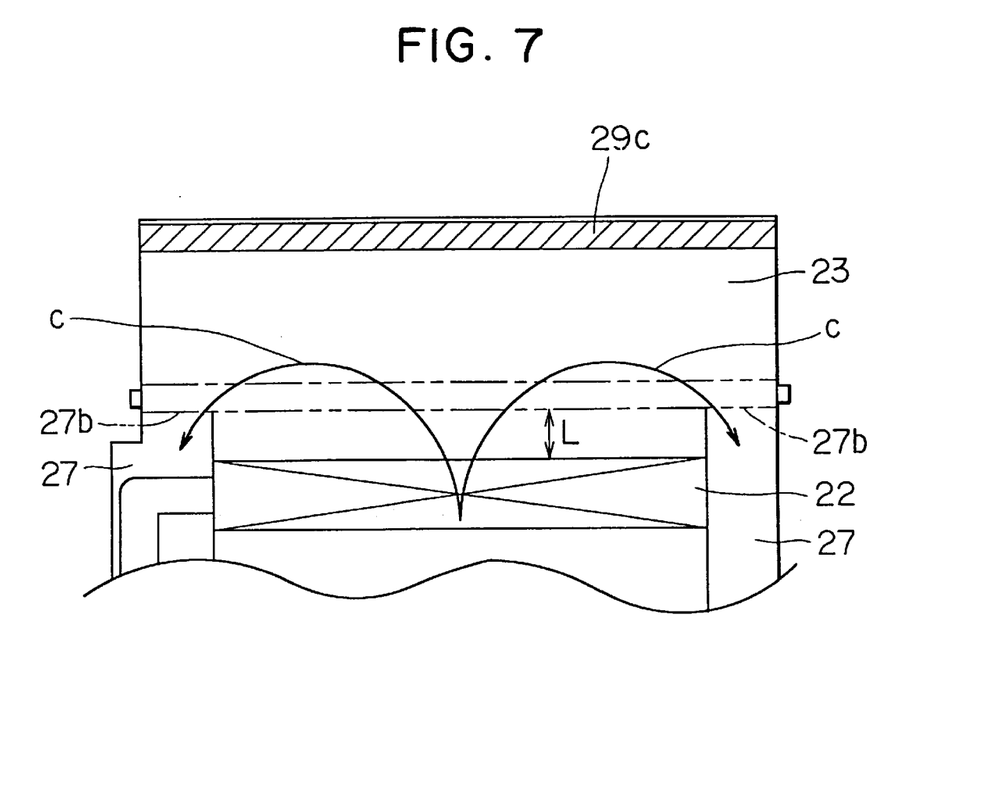
FIG. 7 is a cross sectional view as viewed along an arrow VII of FIG. 6.

FIGS. 6 and 7 show an operational position of the door in the bi-level mode, the foot mode, and the foot/defroster mode, in other words, in the air outlet mode where the foot air passage 27 is opened. In the operational position of the door shown in FIGS. 6 and 7, the foot door 29c is operated at a position shown by a solid line so that the inlet portion 27b of the foot air passage 27 is opened (see FIG. 7) and the communication opening 20E is simultaneously closed. Accordingly, the air "c" in the second air passage 19b flows into the foot air passage 27.

In the bi-level mode, the foot door 29c may be operated not to a position where the communication opening 20E is fully closed but to a position where the communication opening 20E is partially opened.

Further, at the side of the first air passage 19a, a wall member 31 is disposed at an downwind side of the heater core 22 at a position adjacent thereto by the minute distance L (for example, approximately 15 mm), and the wall member 31 covers the downwind side of the heater core 22 to narrow the warm air passage at the downwind side of the heater core 22. The wall member 31 is molded integrally with the case made of resin, of the air conditioning unit 2.

Next, an operation of the above-described construction according to this embodiment will be described.

In FIG. 2, air coming from the inside air/outside air switching box 11 flows in the scroll casing 17 in a substantially horizontal direction by the blower fans 15a and 15b and flows into the lower portion of the evaporator 21. After the blown-air is dehumidified and cooled in the evaporator 21, the air further flows upward and is introduced into the heater core 22 to be heated therein.

In this embodiment, the air mixing doors 24a and 24b are employed as air conditioning temperature control means, and by the opening degrees of the air mixing doors 24a and 24b, the air amount ratio between the air passing through the heater core 22 and the air bypassing the heater core 22 is controlled so that a desired temperature of conditioned air is generated.

In FIG. 4, the air mixing door 24a and 24b are operated at the maximum cooling positions so that all amount of cool air cooled by the evaporator 21 bypasses the heater core 22. In FIG. 6, the air mixing door 24a and 24b are operated to a position to some extent before the maximum heating position so that most of blown-air passes through the heater core to become warm air and a part of the blown-air bypasses the heater core 22.

Conditioned air having being reheated to a desired temperature is distributed by each of doors 29a–29c of the air outlet mode switching portion 23 of the upper case portion.

That is, in the face air outlet mode, the face door 29a, the defroster door 29b, and the foot door 29c are operated to positions shown by solid line in FIG. 4 such that the center face air passage 25 is opened, the foot air passage 27 and the defroster air passage 28 are closed, and the communication opening 20E is opened.

Accordingly, all of air having passed through the first and second air passages 19a and 19b, a temperature of which is adjusted, passes through the side face air passage 26 always communicated with the space of the air outlet mode switching portion 23, and is blown out toward a head portion of a passenger in the passenger compartment through the center face air outlet (not shown) and the side face air outlet.

Here, in the maximum cooling operation, as shown in FIG. 4, the air-mixing doors 24a and 24b are operated to fully close the upwind side of the heater core 22 such that all amount of cool air cooled by the evaporator 21 bypasses the heater core 22 as shown by the arrows "a" and "b". Since a hot water valve for shutting off hot water into the hot water circuit is not employed, even in the maximum cooling operation, the hot water always circulates in the heater core 22. Accordingly, the air heated by the hot water in the heater core 22 may be mixed into flows "a" and "b" of cool air by natural convection, as shown by a chain arrow "Y".

However, at the side of the first air passage 19a, the downwind side of the heater core 22 is covered with the wall member 31 by the minute distance L to narrow the warm air passage at the downwind side of the heater core 22. On the other hand, at the side of the second air passage 19b, since the foot door 29c is operated at a position shown by the solid line, the downwind side of the heater core 22 is covered with the foot door 29c by the minute distance L to also narrow the warm air passage at the downwind side of the heater core 22.

Therefore, it is possible to satisfactorily suppress the air heated by the hot water in the heater core 22 from being mixed into flows "a" and "b" of the cool air as shown by the chain arrow Y in FIG. 4. Accordingly, even when the hot water valve is not provided in the hot water circuit of the heater core 22, the maximum cooling capacity can be suppressed from lowering so that the maximum cooling capacity can be secured.

In the defroster air outlet mode, as shown in FIG. 4, each of the face door 29a and the defroster door 29b is operated to a position shown by a two-dot line and the foot door 29c is operated to a position shown by a solid line such that the defroster air passage 28 is opened and the communication opening 20E is opened.

Accordingly, all of air having passed through the first and second air passages 19a and 19b, a temperature of which is adjusted, passes through the defroster air passage 26, and is blown out toward an inner surface of windshield through the defroster air outlet (not shown) and the side face air outlet.

Next, in the bi-level air outlet mode, as shown in FIG. 6, each of the face door 29, the defroster door 29b, and the foot door 29c is operated to a position shown by the solid line such that the center face air passage 25 and the foot air passage 27 are opened, the defroster air passage 28 is closed, and the communication opening 20E are closed.

Accordingly, the air having passed through the first air passage, a temperature of which is adjusted, passes through the center face air passage 25 and the side air passage 26, and is blown out toward a head portion of a passenger in the passenger compartment through the center face air outlet (not shown) and the side face air outlet (not shown). On the other hand, the air having passed through the second air passage 19b, a temperature of which is adjusted, passes through the foot air passage 27, and is blown out toward feet of a passenger compartment through the foot air outlet 27a.

Next, in the foot air outlet mode, as shown in FIG. 6, the face door 29a is operated to a position shown by a two-dot line to close the center face air passage 25. Further, the defroster door 29b is operated to a position which is opened from the position shown by the solid line by a minute angle to slightly open the defroster air passage 28. Further, the foot door 29c is operated to a position shown by the solid line such that the foot air passage 27 is opened and the communication opening 20E is closed. In FIGS. 6 and 7, an arrow "c" shows a flow of the hot air passing through the heater core 22.

Accordingly, the air having passed through the first air passage 19a, a temperature of which is adjusted, passes through the defroster air passage 28 and the side face air passage 26, and is blown out toward an inner surface of windshield through the defroster air outlet (not shown) and the side face air outlet (not shown). On the other hand, the air having passed through the second air passage 19b, a temperature of which is adjusted, passes through the foot air passage 27, and is blown out toward feet of a passenger through the foot air outlet 27a.

Next, in the foot/defroster air outlet mode, the defroster door 29b is operated toward a position shown by a two-dot line from as in the foot air outlet mode such that an opening degree of the defroster air passage 28 is increased and an amount of air blown toward the defroster air outlet is increased. The other operations are same as in the foot air outlet mode.

Further, this embodiment has an inside air/outside air double laminar flow function in which inside air and outside air are partitioned from each other and are independently blown and heat-exchanged such that outside air having a low humidity is blown out from the defroster air outlet (not shown) and warm inside air having been heated is blown out from the foot air outlet 27a, in season required for heating in winter.

An operation and effect as the inside air/outside air double laminar flow unit will be described. In FIG. 3, when the first inside air/outside air switching door 14a is operated to a position shown by slant lines, the door 14a closes the first inside air introduction port 13a and opens the outside air introduction port 12. Similarly, when the second inside air/outside air switching door 14b is operated to a position shown by slant lines, the door 14b opens the second inside air introduction port 13b.

Accordingly, when the fans 15a and 15b of the blower 15 rotate, outside air coming from the outside air introduction port 12 is sucked into the first air passage 19a through the first air suction port 18a, whereas inside air coming from the second inside air introduction port 13b is sucked into the second air passage 19b through the second air suction port 19b. That is, the outside air and the inside air can be blown in the first air passage 19a and the second air passage 19b, respectively, while being partitioned from each other.

Further, an interior of the air conditioning unit 2 is partitioned by partition plates 20A–20C into the first air passage 19a and the second air passage 19b, and the communication opening 20E at a downwind side of the heater core 22, for communicating between the first and second air passages 19a and 19b, is closed by the foot door 29c in the foot mode and the foot/defroster mode. Therefore, in both modes, after outside air having flowed in the first air passage 19a passes through the evaporator 21 and the heater core 22, the outside air is blown out toward an inner surface of the windshield and an upper half of a body of a passenger through the defroster air passage 28 and the side face air passage 26. Here, the outside air having a low humidity is heated by the heater core 22 to be warm air so that the effect for defrosting the windshield of the vehicle can be improved.

On the other hand, the inside air is blown in the second air passage 19b, and this inside air is heated to be warm air. The warm inside air passes through the foot air passage 27, and is blown out toward feet of a passenger through the foot air outlet 27a. Accordingly, when heating the foot portion in the passenger compartment, there is no occurrence of the ventilation load due to the introduction of the outside air; and therefore, the heating effect can be improved under a condition that a temperature of the engine cooling water flowing into the heater core 22 is not sufficiently increased (for example, when a diesel engine for a vehicle is idling).

Accordingly, it is possible to secure both improvements in the effect for defrosting the windshield glass of the vehicle and in the effect for heating.

The explanation has been described with reference only to the case where the outside air and the inside air are simultaneously introduced; however, by selecting operational positions of two inside air/outside air switching doors 14a and 14b between the position shown by the solid line and the position shown by the two-dot line in FIG. 3, all outside air mode in which outside air is introduced into both of the first and second air passages 19a and 19b or all inside air mode in which inside air is introduced into both of the first and second air passages 19a and 19b can be selected.

In the above-described embodiment, the rotary type door having the arcuate circumferential surface is employed for each of the air-mixing doors 24a and 24b; however, the general flat plate door may be employed.

According to the above-described embodiment, in the air conditioning apparatus without having the hot water valve, by using especially the foot door 29c of the air outlet mode switching doors, the warm air passage at the downwind side of the heater core 22 is narrowed to secure the maximum cooling capacity; however, by devising installations of the air passages and the air outlet mode switching doors, the maximum cooling capacity can be secured by using the other air outlet mode switching door, i.e., the face door 29a or the defroster door 29b.

In the above-described embodiment, to secure both improvements in the effect for defrosting the windshield glass of the vehicle and in the effect for heating, the inside air and the outside air are independently blown into the air conditioning unit 2; however, the present invention is not limited to this type of air conditioning apparatus. For example, the present invention may be applied to an air conditioning apparatus for independently controlling temperatures of the air to be blown into the driver's seat side and the passenger's seat side, the so-called right-and-left independent temperature control type air conditioning apparatus. In such a case, since it is not necessary for the inside air and the outside air to be separated into two laminar flows, the partition plate 20 in the blower unit 1 is not necessary. Similarly, it is not necessary to divide a fan into two fans 15a and 15b.

Further, the present invention may be applied to an air conditioning apparatus having an operation mode where the air is simultaneously blown out from both an upper side air outlet (face side air outlet) and a lower side air outlet (foot side air outlet) as in the bi-level mode, the so-called up-and-down independent temperature control type air conditioning apparatus.

Further, the present invention may be applied to an air conditioning apparatus for independently controlling temperatures of the air to be blown into the front seat side and the rear seat side, the so-called front-and-rear independent temperature control type air conditioning apparatus.

In this left-and-right independent temperature control type, up-and-down independent temperature control type, or front-and-rear independent temperature control type air conditioning apparatus, temperatures of the air in the first and second air passages 19a and 19b partitioned by the partition plates 20A–20C are independently controlled by the air-mixing doors 24a and 24b, and the conditioned air is blown out into the passenger compartment by selecting a predetermined air outlet.

Although the present invention has been fully described in connection with the preferred embodiments thereof with reference to the accompanying drawings, it is to be noted that various changes and modifications will become apparent to those skilled in the art. Such changes and modifications are to be understood as being included within the scope of the present invention as defined in the appended claims.

What is claimed is:

1. An air conditioning apparatus for a vehicle having a passenger compartment, comprising:
    a blower for blowing air;
    a cooling heat exchanger for cooling said air blown by said blower;
    a heating heat exchanger disposed at an air downstream side of said cooling heat exchanger, for heating said air blown by said blower by using fluid always flowing through said heating heat exchanger as a heating source;
    an air-mixing door disposed at an air upstream side of said heating heat exchanger, for controlling a temperature of said conditioned air to be blown into said passenger compartment by adjusting a ratio between an amount of air flowing through said heating heat exchanger and an amount of air bypassing said heating heat exchanger;
    a case having therein a hot air passage formed between an air downstream side of said heating heat exchanger and a mixing point where said air flowing through said heating heat exchanger mixes with said air bypassing said heating heat exchanger, said case further having a plurality of air passages formed at an air downstream side of said mixing point for introducing the conditioned air toward different portions of said passenger compartment, said plurality of air passage including at least a face air passage for introducing the conditioned air toward an upper portion of said passenger compartment; and
    an air outlet mode switching door disposed at an air downstream side of said mixing point for selectively opening and closing said plurality of air passages, wherein,
    said hot air passage has a first dimension at an air upstream location from said mixing point when said face air passage is closed and a second dimension at said air upstream location from said mixing point when said face air passage is open, said second dimension being narrower than said first dimension.

2. An air conditioning apparatus according to claim 1, wherein said plurality of air passages includes a foot air passage for introducing the conditioned air toward a lower portion of said passenger compartment, and a defroster air passage for introducing the conditioned air toward an inner surface of a windshield of said vehicle.

3. An air conditioning apparatus according to claim 2, wherein,
    said air outlet mode switching door includes a foot door for opening and closing said foot air passage,
    when said face air passage is opened, said foot door is operated to a position where said foot air passage is closed and said warm air passage is narrowed.

4. An air conditioning apparatus according to claim 3, wherein,
    said case has therein a main air passage passing through said heating heat exchanger,
    said foot air passage is formed at either side of said main passage, and
    said foot door is constructed by a single plate door and arranged to close said foot air passage and said warm air passage.

5. An air conditioning apparatus according to claim 3, wherein,
    said case has therein a main air passage passing through said heating heat exchanger,
    said foot air passage is formed at both sides of said main passage, and
    said foot door is constructed by a single plate door and arranged to close said foot air passage and said warm air passage.

6. An air conditioning apparatus according to claim 1, wherein,
    said cooling heat exchanger is disposed in a substantially horizontal direction at an instrumental panel portion of said vehicle in such a manner that air blown by said blower is introduced into said evaporator from a lower side thereof and air cooled in said evaporator is introduced out from an upper side thereof, said heating heat exchanger is disposed in a substantially horizontal direction at an upper side of said cooling heat exchanger to heat air having passed through said cooling heat exchanger, and said air outlet mode switching door is disposed at an upper side of said heating heat exchanger.

7. An air conditioning apparatus according to claim 1, further comprising:

an air conditioning case for accommodating said cooling heat exchanger and said heating exchanger and having an air passage;

a partition member disposed in said air conditioning case in parallel with a flowing direction of air blown by said blower, for partitioning said air passage into a first air passage and a second air passage;

an inside air/outside air switching box for introducing at least one of inside air and outside air; wherein, said blower blows air having been introduced into said inside air/outside air switching box such that the outside air is selectively blown in said first air passage and the inside air is selectively blown into said second air passage, and the outside air from said first air passage is blown into said defroster air passage and the inside air from said second air passage is blown into said foot air passage.

8. An air conditioning apparatus according to claim 7, further comprising:

means for forming a communication opening for communication between said first air passage and said second air passage, wherein, when said foot air passage is opened by said foot door, said communication opening is closed by said foot door.

9. An air conditioning apparatus according to claim 1, wherein said fluid flowing through said heating heat exchanger is cooling water for cooling an engine of the vehicle.

10. An air conditioning apparatus according to claim 9, wherein said cooling water passes through said heating heat exchanger even when said air-mixing door is operated at a position where all of cool air cooled by said cooling heat exchanger bypasses said heating heat exchanger.

11. An air conditioning apparatus for a vehicle having a passenger compartment, comprising:

a blower for blowing air;

a heating heat exchanger for heating said air blown by said blower by using fluid always flowing through said heating heat exchanger as a heating source;

an air-mixing door disposed at an air upstream side of said heating heat exchanger, for controlling a temperature of conditioned air to be blown into said passenger compartment by adjusting a ratio between an amount of air flowing through said heating heat exchanger and an amount of air bypassing said heating heat exchanger;

a case having therein a hot air passage formed between an air downstream side of said heating heat exchanger and a mixing point where said air flowing through said heating heat exchanger mixes with said air bypassing said heating heat exchanger, said case further having a plurality of air passages formed at an air downstream side of said mixing point for introducing the conditioned air toward different portions of said passenger compartment, said plurality of air passage including at least a face air passage for introducing the conditioned air toward an upper portion of said passenger compartment; and an air outlet mode switching door disposed at an air downstream side of said mixing point for selectively opening and closing said plurality of air passages, wherein, said hot air passage has a first dimension at an air upstream location from said mixing point when said face air passage is closed and a second dimension at said air upstream location from said mixing point when said face air passage is open, said second dimension being narrower than said first dimension.

12. An air conditioning apparatus according to claim 1, wherein:

said air outlet mode switching door is rotated around a rotation shaft in a rotation range; and said rotation shaft is rotatably disposed in said case at a most upstream air side in said rotation range.

13. An air conditioning apparatus according to claim 11, wherein:

said air outlet mode switching door is rotated around a rotation shaft in a rotation range; and said rotation shaft is rotatably disposed in said case at a most upstream air side in said rotation range.

14. An air conditioning apparatus for a vehicle having a passenger compartment, comprising:

a blower for blowing air;

a cooling heat exchanger for cooling said air blown by said blower;

a heating heat exchanger disposed at an air downstream side of said cooling heat exchanger, for heating said air blown by said blower;

an air-mixing door disposed at an air upstream side of said heating heat exchanger, for controlling a temperature of conditioned air to be blown into said passenger compartment by adjusting a ratio between an amount of air flowing through said heating heat exchanger and an amount of air bypassing said heating heat exchanger;

a case having therein a hot air passage formed between an air downstream side of said heating heat exchanger and a mixing point where said air flowing through said heating heat exchanger mixes with said air bypassing said heating heat exchanger, said case further having a plurality of air passages formed at an air downstream side of said mixing point for introducing the conditioned air toward different portions of said passenger compartment, said plurality of air passage including at least a face air passage for introducing the conditioned air toward an upper portion of said passenger compartment; and an air outlet mode switching door disposed at an air downstream side of said mixing point for selectively opening and closing said plurality of air passages, wherein, said hot air passage has a first dimension at an air upstream location from said mixing point when said face air passage is closed and a second dimension at said air upstream location from said mixing point when said face air passage is open, said second dimension being narrower than said first dimension.

15. An air conditioning apparatus for a vehicle having a passenger compartment, comprising:

a blower for blowing air;

a cooling heat exchanger for cooling said air blown by said blower;

a heating heat exchanger disposed at an air downstream side of said cooling heat exchanger, for heating said air blown by said blower by using fluid always flowing through said heating heat exchanger as a heating source;

an air-mixing door disposed at an air upstream side of said heating heat exchanger, for controlling a temperature of conditioned air to be blown into said passenger compartment by adjusting a ratio between an amount of air flowing through said heating heat exchanger and an amount of air bypassing said heating heat exchanger;

a case having therein a hot air passage formed between an air downstream side of said heating heat exchanger and a mixing point where said air flowing through said heating heat exchanger mixes with said air bypassing said heating heat exchanger, said case further having a plurality of air passages formed at an air downstream side of said mixing point for introducing the conditioned air toward different portions of said passenger compartment, said plurality of air passage including at least a face air passage for introducing the conditioned air toward an upper portion of said passenger compartment; and an air outlet mode switching door disposed at an air downstream side of said mixing point for selectively opening and closing said plurality of air passages, wherein;

said hot air passage has a first dimension at an air upstream location from said mixing point when said face air passage is closed and a second dimension at said air upstream location from said mixing point when said face air passage is open, said second dimension being narrower than said first dimension;

said plurality of air passages includes a foot air passage for introducing the conditioned air toward a lower portion of said passenger compartment, an inlet opening of said foot air passage being provided at an approximate side position of said heating heat exchanger and a defroster air passage for introducing the conditioned air toward an inner surface of a windshield of said vehicle;

said air outlet mode switching door includes a foot door for opening and closing said foot air passage;

when said face air passage is opened, said foot door is operated to a position where said foot air passage is closed and said warm air passage is narrowed;

said case has therein a main air passage passing through said heating heat exchanger;

said foot air passage is formed at either side of said main passage; and said foot door is constructed by a single plate door and arranged to close said foot air passage and said warm air passage.

16. An air conditioning apparatus for a vehicle having a passenger compartment, comprising:

a blower for blowing air;

a heating heat exchanger for heating said air blown by said blower by using fluid always flowing through said heating heat exchanger as a heating source;

an air-mixing door disposed at an air upstream side of said heating heat exchanger, for controlling a temperature of conditioned air to be blown into said passenger compartment by adjusting a ratio between an amount of air flowing through said heating heat exchanger and an amount of air bypassing said heating heat exchanger;

a case having therein a hot air passage formed between an air downstream side of said heating heat exchanger and a mixing point where said air flowing through said heating heat exchanger mixes with said air bypassing said heating heat exchanger, said case further having a plurality of air passages formed at an air downstream side of said mixing point for introducing the conditioned air toward different portions of said passenger compartment, said plurality of air passage including at least a face air passage for introducing the conditioned air toward an upper portion of said passenger compartment; and an air outlet mode switching door disposed at an air downstream side of said mixing point for selectively opening and closing said plurality of air passages, wherein;

said hot air passage has a first dimension at an air upstream location from said mixing point when said face air passage is closed and a second dimension at said air upstream location from said mixing point when said face air passage is open, said second dimension being narrower than said first dimension;

said plurality of air passages includes a foot air passage for introducing the conditioned air toward a lower portion of said passenger compartment, an inlet opening of said foot air passage being provided at an approximate side position of said heating heat exchanger and a defroster air passage for introducing the conditioned air toward an inner surface of a windshield of said vehicle;

said air outlet mode switching door includes a foot door for opening and closing said foot air passage;

when said face air passage is opened, said foot door is operated to a position where said foot air passage is closed and said warm air passage is narrowed;

said case has therein a main air passage passing through said heating heat exchanger;

said foot air passage is formed at either side of said main passage; and said foot door is constructed by a single plate door and arranged to close said foot air passage and said warm air passage.

17. An air conditioning apparatus for a vehicle having a passenger compartment, comprising:

a blower for blowing air;

a cooling heat exchanger for cooling said air blown by said blower;

a heating heat exchanger disposed at an air downstream side of said cooling heat exchanger, for heating said air blown by said blower;

an air-mixing door disposed at an air upstream side of said heating heat exchanger, for controlling a temperature of conditioned air to be blown into said passenger compartment by adjusting a ratio between an amount of air flowing through said heating heat exchanger and an amount of air bypassing said heating heat exchanger;

a case having therein a hot air passage formed between an air downstream side of said heating heat exchanger and a mixing point where said air flowing through said heating heat exchanger mixes with said air bypassing said heating heat exchanger, said case further having a plurality of air passages formed at an air downstream side of said mixing point for introducing the conditioned air toward different portions of said passenger compartment, said plurality of air passage including at least a face air passage for introducing the conditioned air toward an upper portion of said passenger compartment; and an air outlet mode switching door disposed at an air downstream side of said mixing point for selectively opening and closing said plurality of air passages, wherein;

said hot air passage has a first dimension at an air upstream location from said mixing point when said face air passage is closed and a second dimension at said air upstream location from said mixing point when said face air passage is open, said second dimension being narrower than said first dimension;

said plurality of air passages includes a foot air passage for introducing the conditioned air toward a lower portion of said passenger compartment, an inlet opening of said foot air passage being provided at an approximate side position of said heating heat exchanger and a defroster air passage for introducing the conditioned air toward an inner surface of a windshield of said vehicle;

said air outlet mode switching door includes a foot door for opening and closing said foot air passage;

when said face air passage is opened, said foot door is operated to a position where said foot air passage is closed and said warm air passage is narrowed;

said case has therein a main air passage passing through said heating heat exchanger;

said foot air passage is formed at either side of said main passage; and said foot door is constructed by a single plate door and arranged to close said foot air passage and said warm air passage.

* * * * *